United States Patent [19]

Moore et al.

[11] 3,981,199

[45] Sept. 21, 1976

[54] PRESSURE TRANSDUCER

[75] Inventors: Leonard W. Moore; Ronald L. Bodle, both of Northridge; Conrad Fiederer, Agoura, all of Calif.

[73] Assignee: Moore Industries, Sepulvada, Calif.

[22] Filed: Aug. 29, 1975

[21] Appl. No.: 608,889

[52] U.S. Cl. .................................. 73/420; 73/431
[51] Int. Cl.² ........................................ G01L 7/00
[58] Field of Search ............ 73/420, 4 R, 431, 418, 73/389; 251/143, 149.6; 137/557

[56] References Cited
UNITED STATES PATENTS

| 2,386,270 | 10/1945 | Samiran | 251/149.6 |
| 3,280,834 | 10/1966 | Zahuranec | 251/149.6 |

*Primary Examiner*—Donald O. Woodiel
*Attorney, Agent, or Firm*—Julius L. Rubinstein

[57] ABSTRACT

This invention relates to a pressure transducer, and more particularly to a pressure transducer having means by which the pressure transducer can be removed from a pressurized line without loss of line pressure. The pressure transducer is mounted in a housing, which is adapted to be releasably mounted on a bracket. The bracket is provided with a tubular needle valve coupling which is adapted to be connected to a pressurized line. The coupling normally keeps the pressurized line closed, but when the housing of the pressure transducer is mounted on the bracket, the needle valve in the coupling is automatically actuated, opening the pressure transducer to the pressure in the line.

36 Claims, 8 Drawing Figures

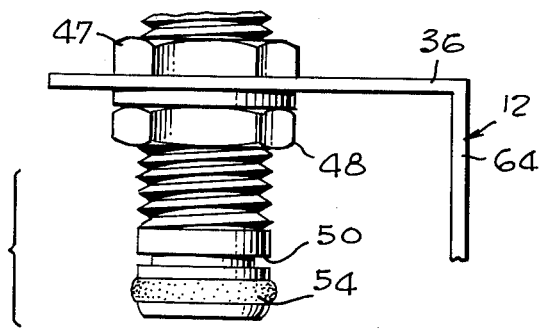
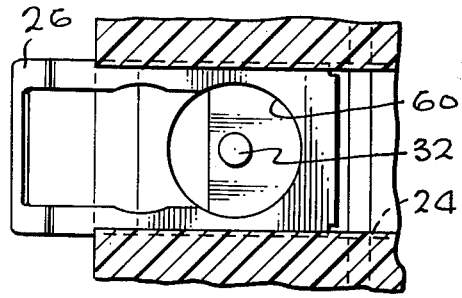
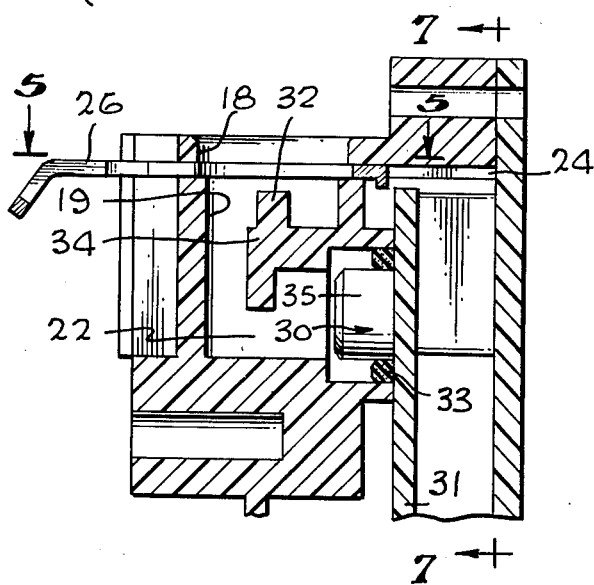
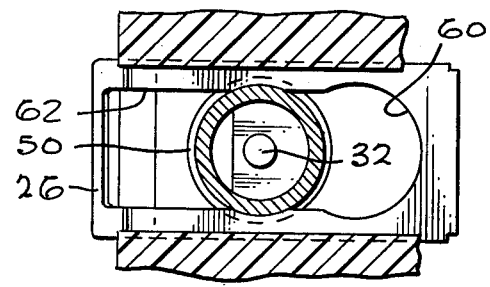
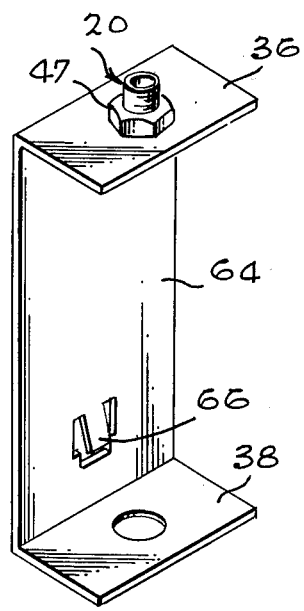
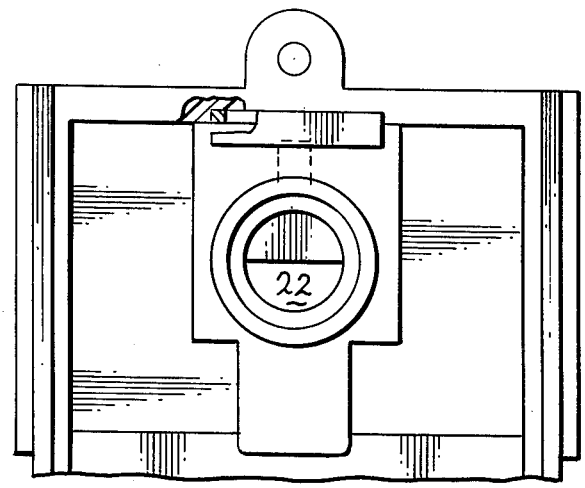

PRESSURE TRANSDUCER

BACKGROUND AND BRIEF SUMMARY

Heretofore, pressure gauges were commonly used to measure the pressure in pressurized systems. However, as control systems have become increasingly automated, it has become more useful and convenient to convert the line pressure into a proportional voltage or current.

Typically, a conversion from pressure into an equivalent voltage or current involves a diaphragm which moves in accordance with the line pressure exerted against it. The diaphragm may actuate a strain gauge or other electrical device to provide the required current or voltage. The current or voltage which is generated by the movement of the diaphragm is usually too small to be useful in its initial form and so amplification is required. A convenient way to do this is to utilize a chopper stabilized DC amplifier. All this, however, involves some rather complex circuitry, and when the transducer is mounted in a housing along with the circuitry, periodic servicing or replacement is required. If servicing is required, it would be desireable to be able to perform it as easily as possible without any disruption of the line pressure, or leakage of the pressurized contents in the line into the ambient air.

What is needed, therefore, and comprises an important object of this invention, is to provide a pressure transducer which can be quickly and easily connected or disconnected from a pressurized line without disturbing the line pressure.

This and other objects of this invention will become more apparent when better understood in the light of the accompanying drawings and specifications, wherein:

FIG. 4 is a fragmentary side sectional view of a portion of the pressure transducer constructed according to the principals of this invention, but with the tubular coupling separated from the pressure transducer housing.

FIG. 5 is a sectional view taken on a line 5—5 of FIG. 4, showning the locking device in an open position.

FIG. 6 is a view similar to that shown in FIG. 5 but with the locking device in a locking position.

FIG. 7 is a view partially taken on the line 7—7 of FIG. 4, but with the pressure transducer removed.

FIG. 8 is a perspective view of the bracket showing the tubular coupling mounted therein.

Figure 1:
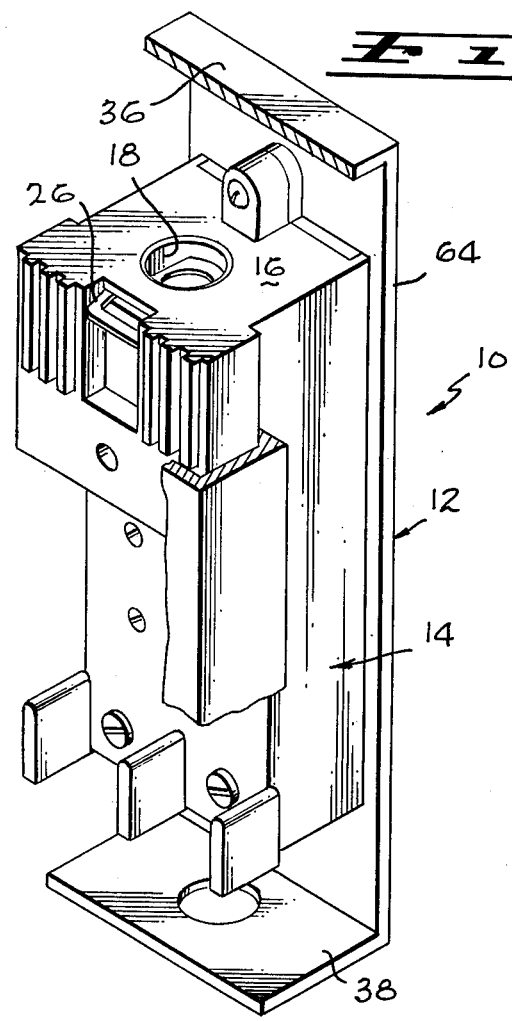
FIG. 1 is a perspective view of the pressure transducer constructed according to the principles of this invention.

Referring now to FIG. 1 of the drawings, a pressure transducer housing support indicated generally by the reference numeral 10, in the particular embodiment shown, comprises a support stand or support bracket 12 and a pressure transducer housing 14. The stand 12 is formed preferably from a rigid planar metal and is generally channel shaped in longitudinal cross section to define a planar foot portion, a transverse planar leg portion, and a transverse planar top wall.

The pressure transducer housing includes a top wall 16. This top wall is provided with a tubular coupling receiving bore 18 for receiving a tubular coupling 20, see FIG. 3. The bore 18 opens into a sealed chamber 22 (which could be part of the bore) inside the housing, see FIG. 2 and 4. In addition, the pressure transducer housing 14 is provided with a slide-way 24 for receiving a locking slide 26, see FIGS. 4, 5 and 6. The slide-way is situated in a plane generally transverse to the axis of the tubular coupling receiving bore 18. A pressure transducer 30 is mounted in chamber 22 as shown in FIG. 4. The pressure transducer itself is a generally conventional device typically including a diaphragm, a strain gauge, and some associated elecrical components, all mounted in a can 35 and connected to a suitable amplifier (not shown). In the present embodiment, the pressure transducer is mounted directly on to the printed circuit board 31 which also serves as a support for the pressure transducer. An "O" ring 33 is mounted over the can 35 of the pressure transducer 30 to retain pressure inside chamber 22, see FIG. 2. In operation, when the pressure transducer is subjected to pressure inside chamber 22, the diaphragm deflects and varies an electrical component, usually a strain gauge, to help produce an electrical signal (voltage or current) proportional to the pressure inside the chamber 22. In addition, the pressure transducer housing 14 contains an electrical circuit (not shown) such as a chopper stabilized DC amplifier mounted on the printed circuit board 31 to provide suitable amplification of the current or voltage developed by the deflection of the diaphragm in the pressure transducer.

The chamber 22 inside housing 14 is also provided with an integrally formed upwardly projecting pin 32, rigidly mounted on a support 34 formed in chamber 22 for reasons to be described below.

Figure 2:
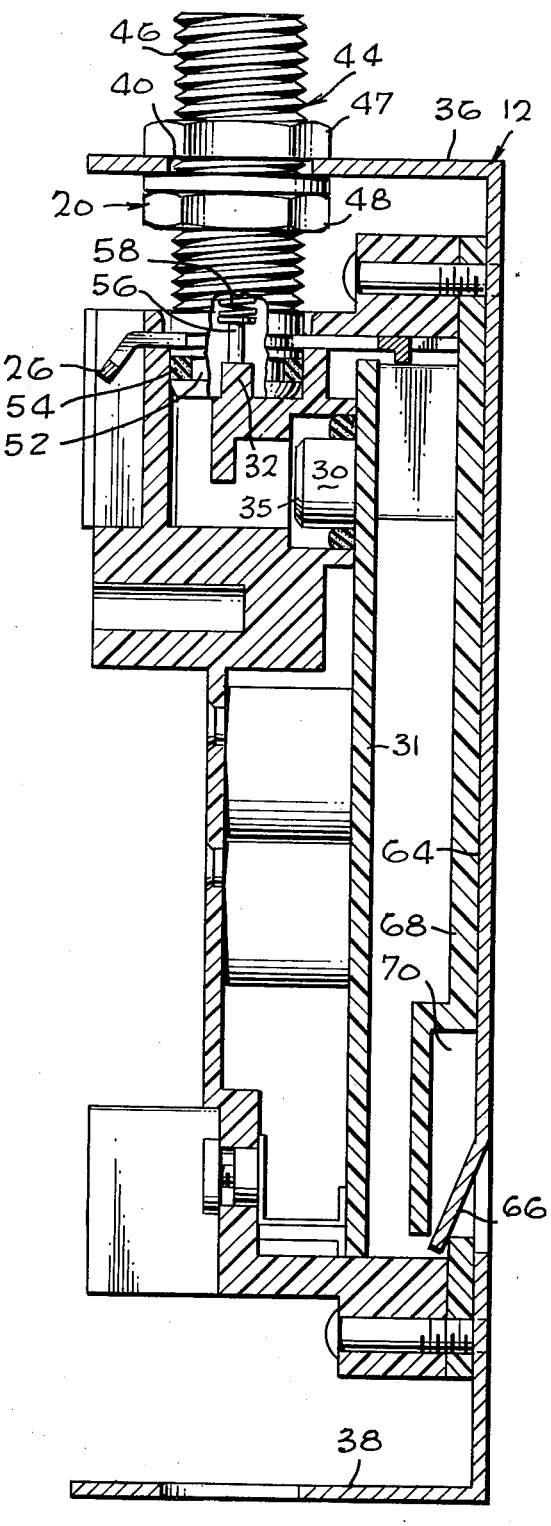
FIG. 2 is a sectional side view of the pressure transducer shown in FIG. 1.
Figure 3:
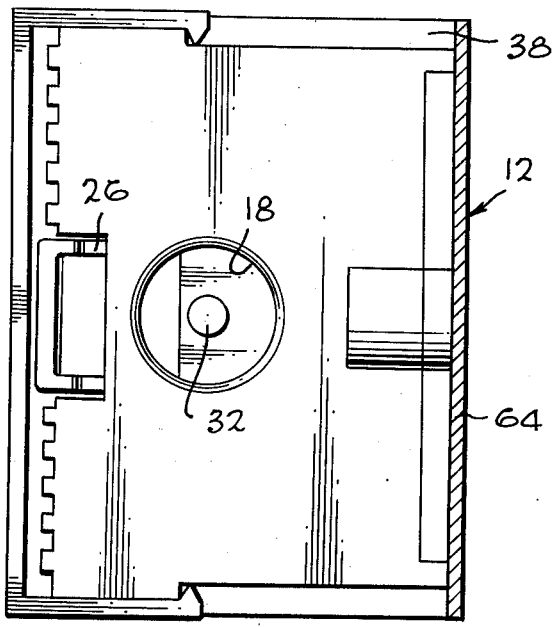
FIG. 3 is a plan view of the pressure transducer as shown in FIG. 1.

As stated above, the bracket or stand 12 includes a planar top wall 36, a transverse leg portion 64 and a transverse planar foot portion 38. A bore 40 is formed in the planar top wall 36 (see FIG. 2). A tubular coupling 20 is provided as shown in FIG. 2. This coupling comprises a tubular member 44 with external threads 46 and the coupling extends through the bore 40. The tubular member 44 is releasably locked to top wall 36 of the bracket 12 by means of locking member 47 and locking nut 48 mounted below the top wall 36, see FIG. 2 and FIG. 8. The upper part of the tubular member 44 is dimensioned so it can be coupled to a standard pressurized line. The lower part of the tubular member 44 is provided with an upper groove 50 and a lower groove 52 in which is mounted an O ring 54, or other suitable sealing device. This O ring is designed to be in sealing engagement with the O ring engaging wall 19 of the bore 18 when the tubular coupling is mounted inside the bore to hold pressure inside chamber 22, see FIG. 2. The coaction between the O ring 54 and the walls 19 of the bore 18 form part of a time delay mechanism to be described below.

A generally conventional valve actuated by needle pin 56 is mounted inside the lower part of the tubular member 44. The pin 56 is recessed inside the entrance to the lower part of the tubular coupling member 44 to prevent the valve from being opened accidently. A spring 58 exerts pressure on the needle pin 56 to keep the valve in a normally closed position.

When the tubular member 44 is inserted inside bore 18 of the pressure transducer housing 14, the pin 32 is forced against the pin 56, opening the needle valve and letting the pressure fill the chamber 22.

To hold the tubular member 20 in the pressure transducer housing 14, the locking slide 26 is formed from a generally rectangular piece of sheet metal with a circular opening 60 extending therethrough, see FIGS. 5 and 6. The circular opening communicates with a rectangular slot 62. The diameter of the circular opening is substantially equal to the external diameter of the tubular member to permit the tubular member to pass through it. However, the width of the rectangular slot 62 is smaller than the external diameter of the tubular member and slightly larger than the diameter of the upper groove 50 in the tubular member.

With this arrangement, after the tubular member 20 is inserted into the bore 18 and through the hole 60 in the slide 26, until the slide 26 is in the same plane as the plane of upper groove 50, the slide is moved from the position shown in FIG. 5 to the postion shown in FIG. 6. Since as stated above, the width of the slot 62 is smaller than the diameter of the tubular member 44, but large enough to embrace the diameter of groove 50, this movement of the slide locks the pressure transducer housing 44 to the stand 12. Hence, the bracket or stand 12, the tubular coupling member 20, and the pressure transducer housing 14 are all releasably connected together.

It is important that in connecting or disconnecting the tubular coupling 20 from the pressure transducer housing 14 that there be no leakage or disturbance in the line pressure. To do this, the pin 32 must be located so that it does not enter into the coupling member 20 to engage the pin 56 and thereby open the needle valve until after the O ring is in sealing engagement with the walls 19 of the bore 18. Similarly, it is important when disconnecting or separating the pressure transducer housing 14 from the tubular coupling 20 that the O ring, or other suitable sealing device, maintain a seal with the walls 19 of bore 18 until after the pin 32 moves out of engagement with the pin 56. The geometry of the parts, including the length and position of the pin 56, the positions of the pin 32 and the length of the walls 19 of the bore 18 satisfy this requirement and function as a time delay to give the pin 56 time to move and close off the tubular coupling when the pressure transducer housing 14 is being moved out of engagement with the tubular coupling 20. The reason is, when the pressure transducer housing is moved so pin 32 moves out of engagement with the pin 56, the O ring 54 is still moving in sealing engagement with the walls 19 of bore 18. Conversely, when connecting the pressure transducer housing to the tubular coupling 20, the length of the walls 19 in relation to the location of pin 32 and the pin 56 is such that the O ring 54 has moved into sealing engagement with the walls 19 before the pin 32 engages pin 56, thereby sealing the chamber 22 before the valve and the coupling opens. Of course, the time delay produced by the geometric arrangement of the parts described above could also be done electronically if desired.

To provide for a more rigid connection between the stand or bracket 12 and the pressure transducer housing 14, the leg portion 64 of the stand is provided with a downwardly and inwardly inclined tang 66. The back-wall 68 of the pressure transducer housing 14 is provided with a tang receiving slot 70, see FIG. 3.

With this arrangement, to mount the pressure transducer housing 14 to the bracket 12 and the tubular coupling 44, the back wall 68 of the pressure transducer housing 14 is moved upward against the leg portion 64 of the stand 12 until the tang 66 enters into the slot 70. At the same time the housing 14 is moved so the tubular coupling 20 enters into the bore 18 until the pin 32 presses against the spring biased pin 56 to open the needle valve, permitting pressure to enter chamber 22 to affect the pressure transducer 30. Then slide 26 is moved inwardly to completely lock the bracket or stand 12, the pressure transducer housing 14, and the tubular coupling 20 together. If service is required, the pressure transducer housing 14 can be quickly and easily removed from the bracket 12 and the tubular coupling 44 by simply pulling out the slide 26 and then pushing up the bracket housing 14 until the tang 66 can move out of the tang receiving slot 70. The pressure transducer housing is then lowered until the tubular coupling 44 moves out of the bore 18. When pin 32 moves out of engagement with the spring biased pin 56 the valve closes the valve in the coupling member 44 so nothing in the pressure line escapes and no loss of pressure occurs.

It is understood that the principles of this invention can be practiced with various kinds of supports or stands or, in fact, with no support at all, as where the tubular coupling attached to a pressurized line is connected directly to the pressure transducer housing.

Having shown and described the invention, what I claim is new is as follows:

1. A quick connect-disconnect connector for a pressure transducer comprising a bracket, a tubular coupling mounted on the bracket and adapted to be connected to a pressurized line, a pressure transducer housing support, said housing support adapted to have a pressure transducer attached thereto, means associated with the pressure transducer housing support for releasably connecting it to said tubular coupling in such a way that pressure from said tubular coupling can engage said pressure transducer, and valve means in the tubular coupling to automatically close the tubular coupling when the pressure transducer housing support is removed from the bracket and to automatically open the tubular coupling when the pressure transducer housing support is attached to the bracket so pressure can engage the pressure transducer from the tubular coupling.

2. A quick connect-disconnect connector for a pressure transducer comprising a stand, a tubular coupling mounted on the stand, and adapted to be connected to a pressurized line, a support housing on said stand, said housing having a chamber therein adapted to be connected to said tubular coupling, a pressure transducer operatively associated with said chamber, means for releasably connecting the pressure transducer housing and said chamber to said tubular coupling, and valve means in the tubular coupling to automatically close the tubular coupling when the pressure transducer housing is removed from the stand and to automatically open the tubular coupling when the pressure transducer housing is attached to the stand so pressure can enter the chamber in the pressure transducer housing from the tubular coupling to cause the pressure transducer to provide a signal functionally related to said pressure.

3. A quick connect-disconnect connector for a pressure transducer comprising a stand, said stand including a base, and a connected surface, a bore formed in said surface, a tubular coupling mounted in said bore adapted to be connected to a pressurized line, a support, a pressure transducer housing mounted on the support, said housing having a chamber therein for holding a pressure transducer, means for releasably connecting the pressure transducer housing to the tubular coupling, and valve means in the tubular coupling to automatically close the tubular coupling when the pressure transducer housing is separated from the tubular coupling and to automatically open the tubular coupling when the pressure transducer housing is attached to the tubular coupling so pressure can enter the chamber in the pressure transducer housing through the tubular coupling to cause the pressure transducer to provide a signal functionally related to said pressure.

4. A quick connect-disconnect connector for a pressure transducer comprising a stand, said stand including a base, a transverse member, and a wall, said wall extending from the end of said transverse member remote from said base, a bore formed in said wall, a tubular coupling mounted in said bore and adapted to be connected to a pressurized line, a pressure transducer housing on the stand, said housing having a chamber therein, said chamber adapted to hold a pressure transducer, means for releasably connecting the chamber in the pressure transducer housing to the tubular coupling, and valve means in the tubular coupling to automatically close the tubular coupling when the pressure transducer housing is separated from the tubular coupling, and to automatically open the tubular coupling when the pressure transducer housing is attached to the tubular coupling so pressure from the tubular coupling can enter the chamber in the pressure transducer housing to cause a pressure transducer to provide a signal functionally related to said pressure.

5. A quick connect-disconnect connector for a pressure transducer comprising a tubular coupling adapted to be connected to a pressurized line, a pressure transducer housing, said pressure transducer housing having a tubular coupling receiving bore formed therein and sized to receive said tubular coupling, said pressure transducer housing having a chamber formed therein communicating with said tubular coupling receiving bore, a pressure transducer mounted in said chamber so it is responsive to the pressure in said chamber, means for releasably connecting the chamber in the pressure transducer housing to the tubular coupling, and valve means in the tubular coupling to automatically close said tubular coupling when the pressure transducer housing is separated from the tubular coupling and to automatically open the tubular coupling when the pressure transducer housing is connected to it so pressure can enter into said bore to cause the pressure transducer to provide a signal functionally related to said pressure.

6. A quick connect-disconnect connector for a pressure transducer comprising a bracket, a tubular coupling mounted on the bracket, and adapted to be connected to a pressurized line, a pressure transducer housing, said pressure transducer housing having a tubular coupling receiving bore formed therein, said bore sized to receive said tubular coupling, said pressure transducer housing having a chamber communicating with said tubular coupling receiving bore, a pressure transducer mounted in said chamber so it is responsive to the pressure in the chamber, means for releasably connecting the chamber in said pressure transducer housing to said tubular coupling, and valve means in the tubular coupling to automatically close the tubular coupling when the pressure transducer housing is removed from the bracket and to automatically open the tubular coupling when the pressure transducer housing is attached to the bracket so pressure can enter into the chamber in the pressure transducer housing to cause the pressure transducer to provide a signal proportional to said pressure.

7. A quick connect-disconnect connector for a pressure transducer comprising a support, a tubular coupling adapted to be connected to a pressurized line, a pressure transducer housing releasably mounted on said support, said pressure transducer housing having a tubular coupling receiving bore formed therein, said bore sized to receive said tubular coupling, said pressure transducer housing having a chamber formed therein communicating with said tubular coupling receiving bore, a pressure transducer mounted in said chamber so it is responsive to the pressure in said chamber, and means for releasably connecting the chamber in said pressure transducer housing to said tubular coupling, and valve means in the tubular coupling to automatically close the tubular coupling when the pressure transducer housing is removed from the support and to automatically open the tubular coupling when the pressure transducer housing is attached to the support so pressure can enter into the chamber in the pressure transducer housing to cause said transducer to produce a signal functionally related to said pressure.

8. A quick connect-disconnect connector for a pressure transducer comprising a support, a tubular coupling adapted to be connected to a pressurized line, a pressure transducer housing adpted to be releasably mounted on said support, said pressure transducer housing having a tubular coupling receiving bore formed therein, said bore sized to receive said tubular coupling, a chamber in said pressure transducer housing communicating with said bore, a pressure transducer mounted in said chamber so it is responsive to the pressure in said chamber, a slide-way formed in said pressure transducer housing and situated in a plane transverse to the axis of the tubular coupling receiving bore, a slide slidably mounted in said slide-way, said slide generally rectangular in shape and including a circular opening and a connected rectangular slot extended therethrough, said circular opening in said slide sized to permit the tubular coupling to extend therethrough, said tubular coupling having a slide receiving groove formed therein, the width of said rectangular slot slightly larger than the diameter of said slide receiving groove but smaller than the diameter of said circular opening and said tubular coupling, whereby after said tubular coupling is inserted in said bore and through said circular opening in the slide until the groove in the tubular coupling is in the same plane as the plane of the slide, the slide is moved until the sides of said rectangular slot enters said groove in said tubular coupling to releasably connect said pressure transducer housing to said tubular coupling, and valve means in the tubular coupling to automatically close the tubular coupling when the pressure transducer housing is separated from the tubular coupling and to automatically open the tubular coupling when the pressure transducer housing is attached to the tubular coupling so pressure can enter into the chamber in the pressure transducer housing to cause the pressure transducer to produce a signal proportional to said pressure.

9. A quick connect-disconnect connector for a pressure transducer comprising a bracket, a tubular coupling mounted on said bracket and adapted to be connected to a pressurized line, a pressure transducer housing, said pressure transducer housing having a tubular coupling receiving bore, said bore sized to receive said tubular coupling, a chamber in said pressure transducer housing communicating with said bore, a pressure transducer mounted in said chamber so it is responsive to the pressure in said chamber, a slide-way formed in said pressure transducer housing and situated in a plane transverse to the axis of said tubular coupling receiving bore, a slide slidably mounted in said slide-way, said slide-way generally rectangular in shape and including a circular opening and a connected rectangular slot extending therethrough, said circular opening in said slide sized to permit the tubular coupling to extend therethrough, the width of said slot smaller than the diameter of said circular opening, said tubular coupling having a slide receiving groove formed therein, the width of said rectangular slot slightly larger than the diameter of the slide receiving groove but smaller than the diameter of said tubular coupling, whereby after said tubular coupling is inserted in said bore and through said circular opening until said groove in the tubular coupling is in the same plane as the plane of the slide, the slide is moved until the sides of said rectangular slot enter said groove on said tubular coupling to releasably connect said pressure transducer housing to said tubular coupling and said bracket, and valve means in the tubular coupling to automatically close the tubular coupling when the pressure transducer housing is separated from the tubular coupling and to automatically open the tubular coupling when the pressure transducer housing is attached to the tubular coupling so pressure can enter into said chamber in the pressure transducer housing to cause said pressure transducer to provide a signal proportional to said pressure.

10. A quick connect-disconnect connector for a pressure transducer comprising a support, said support having a projecting portion secured thereto, a pressure transducer housing, said pressure transducer housing having an opening formed therein sized to receive said projecting portion to help secure said support and said pressure transducer housing together, a tubular coupling adapted to be connected to a pressurized line, said pressure transducer housing having a tubular coupling receiving bore formed therein sized to receive said tubular coupling, said pressure transducer housing having a chamber formed therein and communicating with said tubular coupling receiving bore, a pressure transducer mounted in said chamber so it is responsive to the pressure in said chamber, means for releasably connecting the pressure transducer housing to the tubular coupling, and valve means in said tubular coupling to automatically close said tubular coupling when the pressure transducer housing is separated from the tubular coupling and to automatically open the tubular coupling when the pressure transducer housing is connected to the tubular coupling so pressure can enter into the chamber of the pressure transducer housing to cause the pressure transducer to produce a signal proportional to said pressure.

11. A quick connect-disconnect connector for a pressure transdcuer comprising a stand said stand comprising a planar portion, an integrally attached transverse portion, and an integrally attached planar wall, said wall having an opening extending through, a tubular coupling adapted to be connected to a pressurized line extending through said opening, and means releasably mounting said tubular coupling on said wall of said bracket, a pressure transducer housing, said pressure transducer housing having a wall and a back member, the wall of said pressure transducer housing having a tubular coupling receiving bore formed therein and sized to receive said tubular coupling, said pressure transducer housing having a chamber formed therein and communicating with said tubular coupling receiving bore, a pressure transducer mounted in said chamber so it is responsive to the pressure in said chamber, means in the pressure transducer housing and communicating with said bore for releasably connecting the pressure transducer housing to the tubular coupling, and valve means to automatically close said tubular coupling when the pressure transducer housing is separated from the tubular coupling and to automatically open the tubular coupling when then pressure transducer housing is connected to it so pressure can enter in to the chamber of the pressure transducer housing to cause said pressure transducer to produce a signal proportional to said pressure, the transverse portion of said stand having a downwardly inclined tang formed therein, said back member of said pressure transducer housing having a tang receiving opening formed therein to help stabilize the pressure transducer housing on the stand when said means in said pressure transducer housing and communicating with said bore, connects said tubular coupling to said pressure transducer housing.

12. A quick connect-disconnect connector for a pressure transducer comprising a stand said stand generally channel shaped and comprising a planar portion, a transverse portion, and an integrally attached planar wall, said wall having an opening extending therethrough, a tubular coupling adapted to be connected to a pressurized line extending through said opening, and means releasably mounting the tubular coupling to said wall of said stand, a pressure transducer housing having a wall and a back member, the wall of said pressure transducer housing having a tubular coupling receiving bore formed therein and sized to receive said tubular coupling, a chamber in said pressure transducer housing communicating with said bore, a pressure transducer mounted in said chamber so it is responsive to pressure in said chamber, a slide-way formed in said pressure transducer housing and situated in a plane transverse to the axis of the tubular coupling receiving bore, a slide slidably mounted in said slide-way, said slide generally rectangular in shape and including a circular opening and a connected rectangular slot extending therethrough, said circular opening in said slide sized to permit the tubular coupling to extend therethrough, the width of said slot smaller than the diameter of the circular opening, said tubular coupling having a slide receiving groove formed therein, the width of said rectangular slot slightly larger than the diameter of the slide receiving groove but smaller than the diameter of the tubular coupling whereby after the tubular coupling is inserted in said bore and on through said circular opening until said groove in said tubular coupling is in the same plane as the slide, the slide can be moved until the sides of the rectangular slot enter said groove in said tubular coupling to releasably connect said pressure transducer housing to said tubular coupling and to said stand, a pin valve in said tubular coupling, means biasing said pin valve to a tubular coupling closed position, a support mounted in said chamber, an upwardly projecting pin mounted on said support so that when said tubular coupling is inserted in said tubular coupling receiving bore until said slide can lock the tubular coupling in said bore said upwardly projecting pin in said chamber enters said tubular coupling and bears against said pin valve to open the tubular coupling so pressure can enter said chamber to cause said pressure transducer to produce a signal proportional to said pressure, and when said pressure transducer housing is moved so said tubular coupling moves out of said bore, said upwardly projecting pin moves out of engagement with said pin valve so said biasing means moves said pin valve so it closes said tubular coupling to prevent loss of pressure, said transverse portion of said stand having a downwardly inclining tang formed thereon, said back member of said pressure transducer housing having a tang receiving opening formed therein to receive said tang and to help stabilize said pressure transducer housing on said stand when said tubular coupling on said stand is inside said tubular coupling receiving bore and is held there by said slide.

13. The apparatus described in claim 5, including chamber sealing means on the tubular coupling, a time delay associated with said tubular coupling and said pressure transducer housing, said chamber sealing means operating to seal said chamber when said tubular coupling is inserted in said tubular coupling receiving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

14. The apparatus described in claim 6, including chamber sealing means on the tubular coupling, a time delay associated with said tubular coupling and said pressure transducer housing, said chamber sealing means operating to seal said chamber when said tubular coupling is inserted in said tubular coupling receiving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling 15. The apparatus described in claim 7, including chamber sealing means on the tubular coupling, a time delay associated with said tubular coupling and said pressure transducer housing, said chamber sealing means operating to seal said chamber when said tubular coupling is inserted in said tubular coupling; receiving bore; in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

16. The apparatus described in claim 8, including chamber sealing means on the tubular coupling, a time delay associated with said tubular coupling and said pressure transducer housing, said chamber sealing means operating to seal said chamber when said tubular coupling is inserted in said tubular coupling receiving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

17. The apparatus described in claim 9, including chamber sealing means on the tubular coupling, a time delay associated with said tubular coupling and said pressure transducer housing, said chamber sealing means operating to seal said chamber when said tubular coupling is inserted in said tubular coupling receiving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

18. The apparatus described in claim 10, including chamber sealing means on the tubular coupling, a time delay associated with said tubular coupling and said pressure transducer housing, said chamber sealing means operating to seal said chamber when said tubular coupling is inserted in said tubular coupling receiving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

19. The apparatus described in claim 11, including chamber sealing means on the tubular coupling, a time delay associated with said tubular coupling and said pressure transducer housing, said chamber sealing means operating to seal said chamber when said tubular coupling is inserted in said tubular coupling recieving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

20. The apparatus described in claim 12, including chamber sealing means on the tubular coupling, a time delay associated with said tubular coupling and said pressure transducer housing, said chamber sealing means operating to seal said chamber when said tubular coupling is inserted in said tubular coupling receiving bore in said housing, said time delay functioning to prevent the valve means in the tubular coupling from opening when the tubular coupling enters into the tubular coupling receiving bore until after the chamber sealing means on the tubular coupling seals said chamber, and when the tubular coupling is being removed from the tubular coupling receiving bore, said time delay functioning to prevent the chamber from becoming unsealed until after said valve means has time to close said tubular coupling to prevent leakage and loss of pressure in the lines connected to said tubular coupling.

21. The apparatus described in claim 1, including a pressure transducer attached thereto to provide a signal proportional to said pressure, and an amplifier mounted in said housing to amplify said signal.

22. The apparatus described in claim 21 wherein said amplifier is a chopper stabilized D.C. amplifier.

23. The apparatus described in claim 3 including a pressure transducer attached thereto to provide a signal proportional to said pressure, and an amplifier mounted in said housing to amplify said signal.

24. The apparatus described in claim 23 wherein said amplifier is a chopper stabilized D.C. amplifier.

25. The apparatus described in claim 13 including an amplifier associated with said housing to amplify the signal provided by said pressure transducer.

26. The apparatus described in claim 25 wherein said amplifier is a chopper stabilized D.C. amplifier.

27. The apparatus described in claim 16 including an amplifier associated with said housing to amplify the signal provided by said pressure transducer.

28. The apparatus described in claim 27 wherein said amplifier is a chopper stabilized D.C. amplifier.

29. The apparatus described in claim 18 including an amplifier associated with said housing to amplify the signal provided by said pressure transducer.

30. The apparatus described in claim 29 wherein said amplifier is a chopper stabilized D.C. amplifier.

31. The apparatus described in claim 20 wherein said pressure transducer produces a signal proportional to said pressure, and an amplifier mounted in said housing to amplify said signal.

32. The apparatus described in claim 31 wherein said amplifier is a chopper stabilized D.C. amplifier.

33. A quick connect-disconnect connector for a pressure transducer comprising a tubular coupling adapted to be connected to a pressurized line, a pressure transducer housing, said pressure transducer housing having a tubular coupling receiving bore formed therein and sized to receive said tubular coupling, said pressure transducer housing having a chamber therein and communicating with said tubular coupling receiving bore, a pressure transducer mounted in said chamber so it is responsive to the pressure in said chamber, means for releasably connecting the pressure transducer housing to the tubular coupling, and valve means including a valve pin mounted in the tubular coupling, means biasing the valve pin to a valve closed position, a support mounted in said chamber, a pin mounted on said support so that when said tubular coupling is inserted in said tubular coupling receiving bore said pin enters said tubular coupling and bears against said valve pin to open said valve in said tubular coupling so pressure can enter said chamber and cause the pressure transducer to provide a signal proportional to said pressure, said tubular coupling receiving bore having O ring engaging walls, said tubular coupling having an O ring mounted thereon and positioned so that when the tubular coupling enters said tubular coupling receiving bore said O ring engages said walls to seal said chamber and maintain the pressure therein, said pin on said support and said valve pin positioned so said pin does not engage said valve pin to open said valve until after said O ring has engaged the walls of said tubular coupling receiving bore to seal said chamber, said walls long enough so that when said tubular coupling is being removed from the tubular coupling receiving bore said O ring stays in the sealing engagement with said walls to maintain the seal in said chamber until said pin moves out of engagement with said pin in said valve and said valve has time to close.

34. The apparatus described in claim 12 wherein said tubular coupling receiving bore has O ring engaging walls, said tubular coupling having an O ring mounted thereon and positioned so that when the tubular coupling enters said tubular coupling receiving bore said O ring engages said walls to seal said chamber and maintain the pressure therein, said pin on said support and said needle valve positioned so said pin does not engage said needle valve to open it until after said O ring has engaged the walls of the tubular coupling receiving bore to seal said chamber, said walls long enough so that when said tubular coupling is being removed from the tubular coupling receiving bore said O ring stays in sealing engagement with said walls to maintain the seal in said chamber until after said pin moves out of engagement with said needle valve to give the needle valve time to close the tubular coupling to prevent leakage.

35. A quick connect-disconnect connector for a pressure transducer comprising a stand, said stand generally channel shaped and comprising a planar portion, a transverse planar portion, and an integrally attached planar wall, said wall having an opening extending therethrough, tubular coupling adapted to be connected to a pressurized line extending through said opening, means releasably mounting the tubular coupling to the wall of said stand, a pressure transducer housing, said housing adapted to have a pressure transducer attached thereto, means in said pressure transducer for releasably connecting it to said tubular coupling, and valve means in the tubular coupling to automatically close the tubular coupling when the pressure transducer housing is separated from the stand and the tubular coupling and to automatically open the tubular coupling when the pressure transducer housing is attached to the stand and the tubular coupling so pressure can enter the pressure transducer housing from the tubular coupling.

36. A quick connect-disconnect connector for a pressure transducer comprising a stand, said stand generally channel shaped in longitudinal cross section and comprising a planar portion, a transverse planar portion, and an integrally attached planar wall, said wall having an opening formed therein, a tubular coupling adapted to be connected to a pressurized line extending through said opening, means releasably mounting the tubular coupling to the wall of said stand, said tubular coupling having a pin valve mounted therein adapted to be operatively connected to the housing of a pressure transducer, and said leg portion of said stand having a downwardly inclined tang formed therein adapted to enter the housing of a pressure transducer.

* * * * *